United States Patent
Barillaud et al.

(10) Patent No.: US 9,949,072 B2
(45) Date of Patent: *Apr. 17, 2018

(54) WIRELESS SERVICE PROVIDER MANAGEMENT OF GEO-FENCED SPACES

(71) Applicant: International Business Machines Corporation, Armonk, NY (US)

(72) Inventors: Franck Barillaud, Austin, TX (US); Insoo Cho, Pittsburgh, PA (US); Daniel M. Christiani, East Falmouth, MA (US); Mark R. Thill, Seattle, WA (US); David S. Zhang, Norcross, GA (US)

(73) Assignee: International Business Machines Corporation, Armonk, NY (US)

( * ) Notice: Subject to any disclaimer, the term of this patent is extended or adjusted under 35 U.S.C. 154(b) by 262 days.

This patent is subject to a terminal disclaimer.

(21) Appl. No.: 14/472,460

(22) Filed: Aug. 29, 2014

(65) Prior Publication Data

US 2016/0066139 A1  Mar. 3, 2016

(51) Int. Cl.
  *H04W 4/02* (2018.01)
  *H04W 76/02* (2009.01)
  *H04W 48/04* (2009.01)

(52) U.S. Cl.
  CPC ........... *H04W 4/021* (2013.01); *H04W 48/04* (2013.01); *H04W 76/02* (2013.01)

(58) Field of Classification Search
  CPC ..... H04W 4/021; H04W 48/04; H04W 76/02; H04W 8/18
  See application file for complete search history.

(56) References Cited

U.S. PATENT DOCUMENTS

| | | | |
|---|---|---|---|
| 2002/0123934 A1* | 9/2002 | Tanaka | G06Q 20/201 705/20 |
| 2005/0216583 A1 | 9/2005 | Cole et al. | |

(Continued)

FOREIGN PATENT DOCUMENTS

| | | |
|---|---|---|
| CN | 101872445 A | 10/2010 |
| DE | 10316219 A1 | 11/2003 |
| JP | 2000267563 A | 9/2000 |

OTHER PUBLICATIONS

Anonymous, "Elevator Monitoring using Geolocation and Network," An IP.com Prior Art Database Technical Disclosure, IP.com Electronic Publication Aug. 6, 2013, IPCOM000229917D
Apolinarski et al., "Supporting Environment Configuration with Generic Role Assignment," 7th International Conference on Intelligent Environments, Jul. 2011, pp. 1-8, Nottingham, England. D.O.I. 10.1109/IE.2011.17.

(Continued)

*Primary Examiner* — Romani Ohri
(74) *Attorney, Agent, or Firm* — Leonard T. Guzman

(57) ABSTRACT

A wireless provider system can manage services provided to a plurality of electronic wireless devices based upon geo-fenced spaces defined by respective sets of points in space. A wireless provider system can provide wireless access service to the plurality of electronic wireless devices. The wireless provider system can detect that a particular electronic wireless device of the plurality of electronic wireless devices is within a particular geo-fenced space. In response to this detecting, the system can identify at least one service associated with the particular geo-fenced space. The wireless provider system can, in response to the identifying, modify the wireless access service provided to the wireless device by attaching the at least one service to the particular electronic wireless device.

6 Claims, 7 Drawing Sheets

(56) References Cited

U.S. PATENT DOCUMENTS

| | | | |
|---|---|---|---|
| 2006/0099963 A1* | 5/2006 | Stephens | H04W 4/02 455/456.3 |
| 2011/0029398 A1 | 2/2011 | Boudville | |
| 2011/0209201 A1* | 8/2011 | Chollat | G06F 17/30241 726/4 |
| 2011/0313874 A1* | 12/2011 | Hardie | H04W 4/02 705/26.1 |
| 2012/0078643 A1 | 3/2012 | Nagpal et al. | |
| 2012/0079562 A1* | 3/2012 | Anttila | G06F 21/51 726/3 |
| 2012/0136865 A1* | 5/2012 | Blom | G06F 17/30141 707/739 |
| 2012/0137007 A1 | 5/2012 | Schanen | |
| 2013/0212130 A1 | 8/2013 | Rahnama | |
| 2014/0280758 A1* | 9/2014 | Sharma | H04W 4/021 709/219 |

OTHER PUBLICATIONS

Barillaud et al., "Subsidizing Wireless Services in Geo-Fenced Zones," U.S. Appl. No. 14/090,965, filed Nov. 26, 2013.

Barillaud et al., "Subsidizing Wireless Services in Geo-Fenced Zones," U.S. Appl. No. 14/099,417, filed Dec. 6, 2013.

Marshall, P., "Geotrigger puts geofencing in Esri mobile apps," GCN, Technology, Tools and Tactics for Public Sector IT, Dec. 6, 2013, Public Sector Media Group, Copyright 2014 1105 Media, Inc.

Barillaud et al., "Wireless Service Provider Management of Geo-Fenced Spaces," U.S. Appl. No. 14/512,518, filed Oct. 13, 2014.

List of IBM Patents or Patent Applications Treated as Related.

Mell et al., "The NIST Definition of Cloud Computing," National Institute of Standards and Technology, U.S. Department of Commerce, Special Publication 800-145, Sep. 2011.

\* cited by examiner

1

WIRELESS SERVICE PROVIDER MANAGEMENT OF GEO-FENCED SPACES

BACKGROUND

The present disclosure relates to geo-fenced spaces, and more specifically, to management of geo-fenced spaces by wireless service providers.

Mobile devices can use wireless services, such as services offered by various companies offering cellular-based services. As the capabilities of such services has improved, mobile devices, such as laptop computers, tablet computers, smartphones, digital book readers, and other devices, has continued to evolve and to expand in both functionality and breadth of utility. Much of this expansion has occurred at the application level in the form of individualized applications developed for a specific company or entity. A model in which different entities produce individualized applications can be a barrier to entry, especially when the applications require a high level of technical expertise to implement and manage

SUMMARY

According to embodiments, a method can allow for a wireless provider system to manage services provided to a plurality of electronic wireless devices based upon geo-fenced spaces defined by respective sets of points in space. The wireless provider system can provide wireless access service to the plurality of electronic wireless devices. The wireless provider system can detect that a particular electronic wireless device of the plurality of electronic wireless devices is within a particular geo-fenced space. In response to this detecting, the system can identify at least one service associated with the particular geo-fenced space. The wireless provider system can, in response to the identifying, modify the wireless access service provided to the wireless device by attaching the at least one service to the particular electronic wireless device.

Consistent with embodiments, a system can be provided facilitating management of wireless access service provided to a plurality of electronic wireless devices based upon geo-fenced spaces defined by respective sets of points in space. The system can include a set of wireless access point devices configured to provide the wireless access service to the plurality of electronic wireless devices. At least one computer circuit can be configured to detect that a particular electronic wireless device of the plurality of electronic wireless devices is within a particular geo-fenced space and using the wireless access service; identify, in response to the detecting, at least one service associated with the particular geo-fenced space; and modify, in response to the identifying, the wireless access service provided to the wireless device by attaching the at least one service to the particular electronic wireless device.

Embodiments are directed toward a computer program product for a wireless provider system to manage services provided to a plurality of electronic wireless devices based upon geo-fenced spaces defined by respective sets of points in space, the computer program product comprising a computer readable storage medium having program instructions embodied therewith, the program instructions executable by one or more processing circuits of the wireless provider system to cause the one or more processing circuits to: provide, by the wireless provider system, wireless access service to the plurality of electronic wireless devices; detect, by the wireless provider system, that a particular electronic wireless device of the plurality of electronic wireless devices is within a particular geo-fenced space; identify, by the wireless provider system and in response to the detecting, at least one service associated with the particular geo-fenced space; and modify, by the wireless provider system and in response to the identifying, the wireless access service provided to the wireless device by attaching the at least one service to the particular electronic wireless device.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
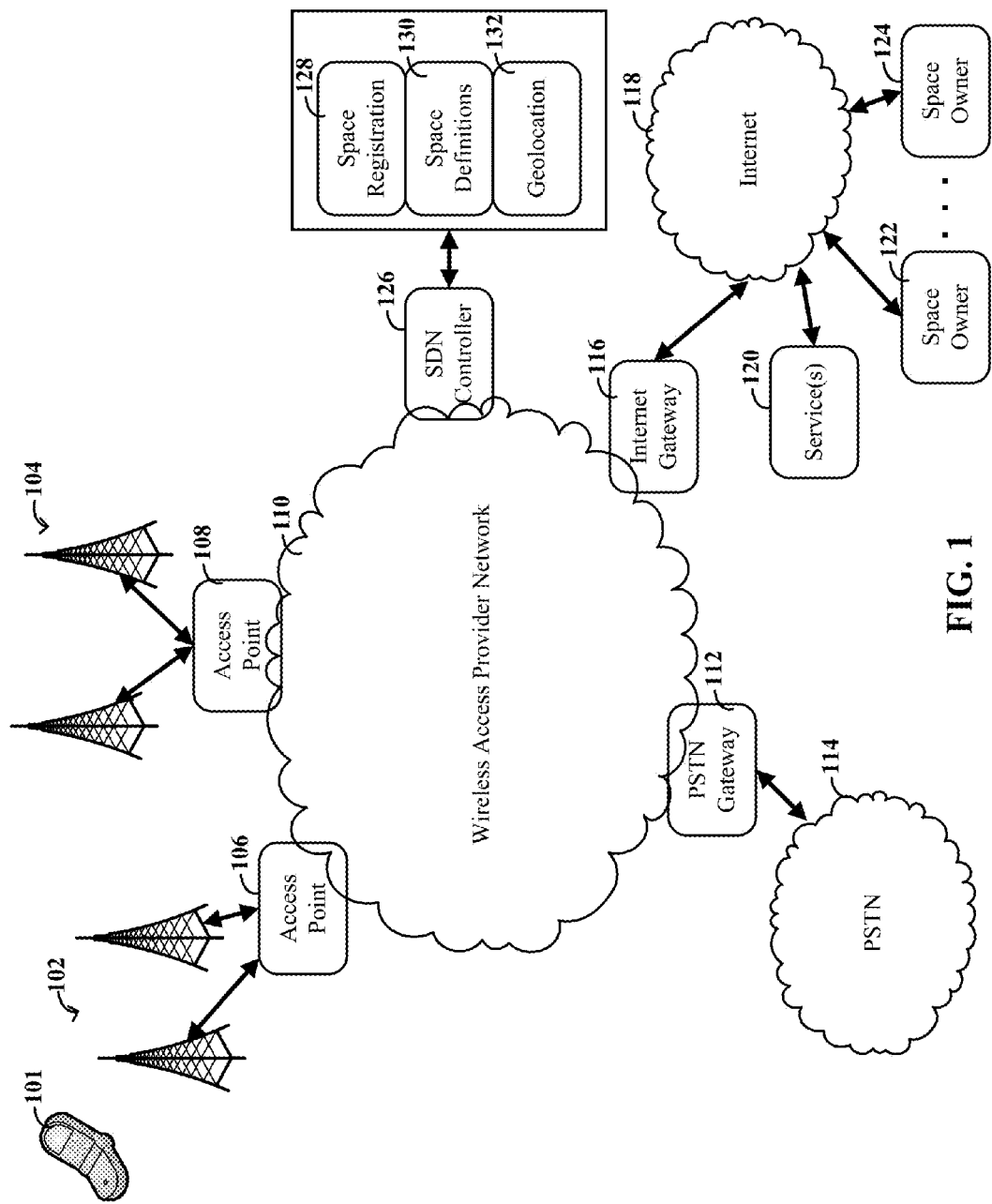
FIG. 1 depicts a block diagram for a system that manages geo-fenced spaces, consistent with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to geo-fenced spaces, more particular aspects relate to registration or management of geo-fenced spaces by wireless service providers. While the present disclosure is not necessarily limited to such applications, various aspects of the disclosure may be appreciated through a discussion of various examples using this context.

Embodiments of the present disclosure are directed toward the use of geo-fenced spaces that can be defined by a set of points in space. The points define boundaries for the spaces and can be used in connection with wireless service providers and their wireless access services. Particular embodiments allow for the wireless access services to be modified for individual devices based upon a variety of factors including, but not limited to, the location of the device relative to one or more geo-fenced spaces.

Various embodiments are directed toward the registration and management of spaces by a wireless service provider system. The wireless service provider system can be configured to manage much of the geo-fenced space features, and thereby can facilitate use of the geo-fenced spaces by their owners (e.g., by providing a simplified interface to the system functions). For instance, a restaurant owner may submit a registration request to create and own a geo-fenced space that corresponds to the borders of the restaurant building or property lines. The registration request can also include an indication of what types of modifications the restaurant owner would like to be made to wireless services. The wireless service provider system can verify that the registration request can be granted. For example, the wireless service provider system can verify whether or not a set of points defining the space provide a valid boundary, check for conflicts with other, existing spaces, and check other constraints. This registration and associated management process can be useful for creating a service that is reliable for the owners of the geo-fenced spaces.

Embodiments of the present disclosure are directed toward a wireless service provider system that is configured to attach services, such as those that provide specialized network traffic, to electronic wireless (or "mobile") devices based upon the device's location relative to geo-fenced spaces. Particular embodiments are directed toward attaching services that have functions designed to use the wireless service provider system's infrastructure and capabilities. For instance, a service might modify how a mobile device interfaces with wireless access points, redirect network traffic and packets, provide in stream packet services (inspection, monitoring, encryption, etc.) and combinations thereof. Other services are possible, many of which are facilitated by the relationship between the wireless service provider system and the devices to which wireless access is provided.

As discussed herein a wireless service provider can provide mobile communication services. A mobile phone service provider is an example of a wireless service provider that provides wireless services over a wireless broadband data network using standards such as 3G, 4G, long-term evolution (LTE), WiMAX, or others. This is different than a traditional wired Internet service provider (ISP) that is being used in connection with a wireless network operating according to IEEE 802.11x specifications or other similar specifications that operate in unlicensed bandwidth and with correspondingly limited range.

Turning now to the figures, FIG. 1 depicts a block diagram for a system that manages geo-fenced spaces, consistent with embodiments of the present disclosure. The block diagram shows an example of a wireless service provider system that can be configured to provide wireless access service to user electronic wireless devices 101. For instance, the wireless access service can be a cellular-based service or a wireless broadband service that is provided using antennas 102, 104 and access point devices 106, 108 that are configured to use 3G, 4G, LTE, WiMAX or other standards. User devices 101 can include devices with computer processing circuits and appropriate wireless communications circuits. A few examples include, but are not necessarily limited to, smart phones, tablets and portable/laptop computers.

Wireless access provider network 110 can connect different components within the wireless service provider system and can sometimes be referred to as a backhaul network. These components can provide gateway functions, monitoring functions, billing functions, routing functions, call handling functions, among other functions. For instance, public switched telephone network (PSTN) gateway 112 can provide access to the PSTN system 114, which can be used for traditional voice calls. Internet gateway 116 can provide access to a wide area network (WAN), such as the global Internet 118, which can be used for Internet-based applications and functions.

Consistent with embodiments, software defining network (SDN) controller 126 can provide a platform upon which geo-fenced space management, configuration and usage can be implemented. In some embodiments, the SDN 126 can be accessible directly from the wireless access provider network 110. In various embodiments, all or part of the SDN 126 can be located remotely and accessible over another network, such as over a WAN, a local area network (LAN) or a dedicated/private connection. For remotely located aspects of SDN 126, a locale module (not shown) can be included as part of the wireless access provider system and can implement and manage modifications to wireless access services based upon instructions received from the SDN 126.

SDN 126 can support modules and functions relating to the registration of spaces, accessing, and maintaining definitions for spaces and handling geolocation data. For example, a space registration module 128 can be configured to register new spaces, modify existing spaces, delete spaces, and handle conflicts between spaces. A space definition module 130 can be configured to store and manage the physical and service-related definitions for the spaces. This can include identifying services associated with different spaces as well as correlating location-based definitions with real world structures and features. For instance, the space definition module 130 can use map data to correlate, create or refine a geo-fenced to be consistent with actual property or building boundaries, which may be owned by the registering space owner. In various embodiments, geolocation module 132 can be configured to determine locations for devices 101 and to identify whether or not the locations are within a geo-fenced space. This can include the use of data from the global positioning system (GPS), cellular towers (e.g., using directional signals, triangulation and/or signal strength) or other sources.

According to embodiments, the SDN controller can be configured to interface with space owners 122, 124. For instance, SDN controller can be accessible using a web-based interface that allows space owners 122, 124 to register, manage and delete spaces that they own. Other interfaces are possible including, but not limited to, dedicated software applications.

Consistent with embodiments of the present disclosure, when SDN controller determines that a particular device has entered or left a particular geo-fenced space, it can use space definitions module 130 to determine what, if any, services should be attached to the particular device. These services can include modifications to the wireless access service provided to the particular device. For example, additional wireless access functions can be provided, such as encryption and packet monitoring when a user device enters a secure location as defined by a geo-fenced space.

In another example, routing of network traffic and communications can be modified. This can include directing certain requests to different services 120 depending upon physical location within one or more geo-fenced spaces. For instance, a user activates a mobile application on the smartphone that requests information and services from a remote server. The SDN controller can modify the wireless access service of the smartphone by directing these requests to the Internet Protocol (IP) address and port that corresponds to a particular server associated with the geo-fenced space and the user. As an example, the application could be a property service (e.g., for tenants, maintenance workers or inspectors) that allows messages, images or other information to be generated for property-related issues. The information can be automatically routed to the responsible party (building owner) based upon the geo-fenced space associated with the property. Thus, as an inspector moves from one building to the next, any issues can be automatically routed to the proper party. Similarly, information originating from services 120 (or space owners 122, 124) can be routed to devices based upon their physical location within a geo-fenced space.

Figure 2:
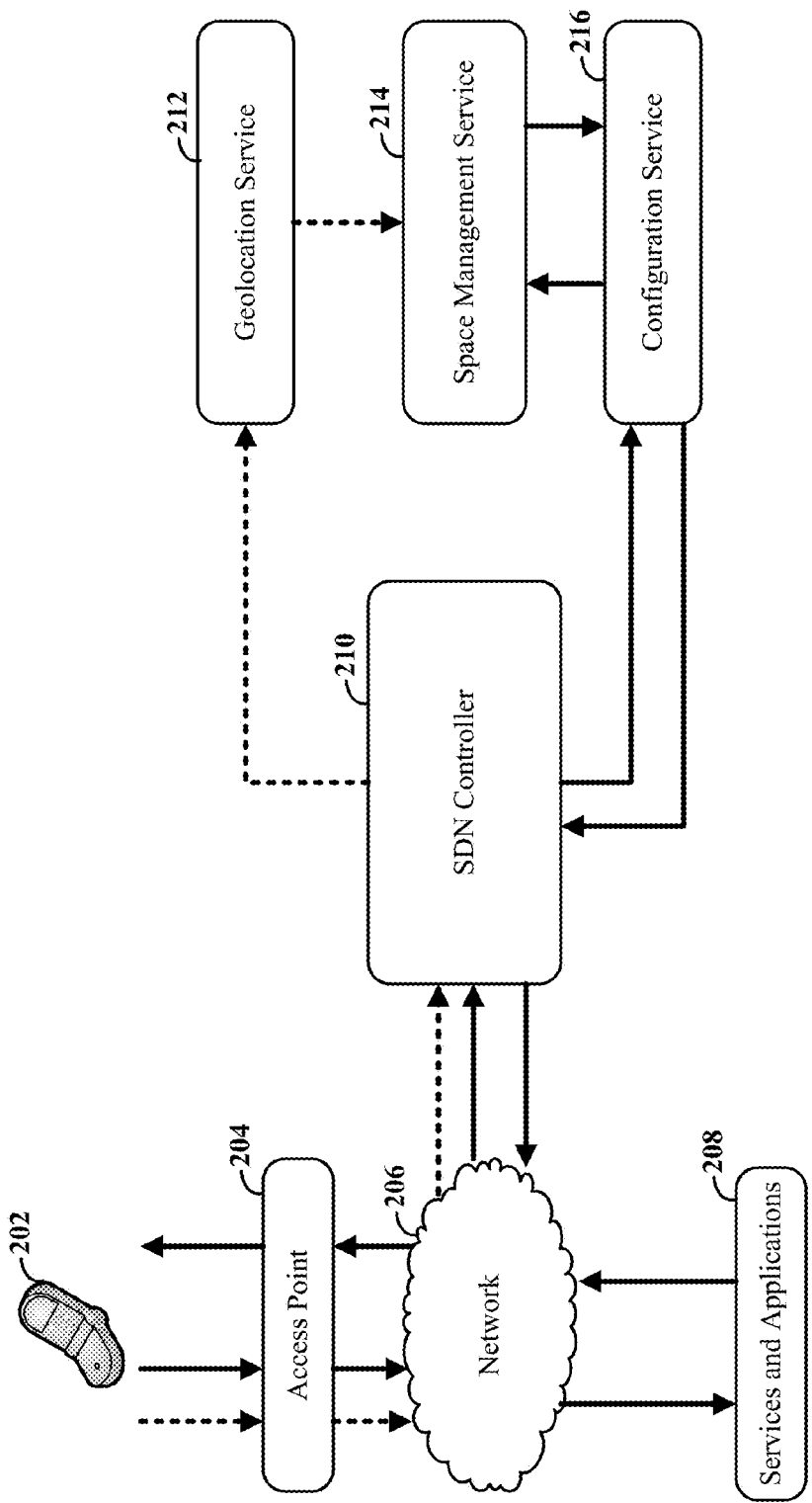
FIG. 2 is a diagram that depicts data flow within a system that provides geo-fenced space management, consistent with embodiments of the present disclosure.

FIG. 2 is a flow diagram that depicts data flow within a system providing geo-fenced space management, consistent with embodiments of the present disclosure. Location specific (geolocation) data transmissions are depicted by dashed lines, while other data transmission are depicted using solid lines. Wireless/mobile device 202 can communicate using access point 204, which can be consistent with corresponding devices and access points discussed herein including those mentioned in connection with FIG. 1. For example, the access point could include a cellular base station with LTE capacities that allow a smartphone to access the Internet. In some embodiments, the mobile device 202 can be configured with one or more software applications that are configured to interact with, and use, functions and services associated with geo-fenced spaces.

Consistent with embodiments, the mobile device 202 can transmit geolocation data using the access point 204 and network 206. The geolocation data can take on a variety of different forms. For instance, the mobile device can determine and provide location coordinates using location services, such as the global positioning system (GPS). In other instances, the location data can be less specific and/or require more analysis by the SDN controller. For example, the identity of the access point used by the device can be used a rough location indication if the physical location of the access point is known. Other information, such as the signal strength of signals from the access point, and from other access points, can also be provided and used.

As discussed herein, network 206 can include a backhaul network, the Internet, private LANs/WANs and combinations thereof. In addition to the geolocation data, other information can also be transmitted. For instance, a software application running on the mobile device may submit a request for services in the form of a data transmission. The request can be directed to the SDN controller 210 along with geolocation data contemporaneous to the location of the device at the time of the request. The SDN controller can provide the geolocation data to a geolocation service module 212. In certain embodiments, the geolocation service module can be configured to process and format received location data so that it can be used by a space management service module 214. For instance, the geolocation service module can be configured to convert the location data into a specific type of coordinates being used by the space management service module (e.g., latitude and longitude). In some embodiments, this can include a location determination algorithm that can use triangulation, signal path, signal strength or other techniques to determine a location for the mobile device.

SDN controller can also provide relevant data to a configuration service module 216. In some embodiments, this information includes data received as part of the request. For instance, the request can identify the requesting device and user, the purpose of the request, the source application for the request, the desired recipient of the data and other aspects. Configuration service module 216 can be designed to generate queries for identifying relevant geo-fenced spaces, associated services, modifications for wireless access and combinations thereof. The query can then be provided to the space management service module 214.

The configuration service module 216 can also be configured to receive and handle requests to register geo-fenced spaces. For instance, the configuration service module 216 can be configured to verify a requested geo-fenced space. Verification can include verifying that the set of points defining the geo-fenced space meet various criteria. One such criterion can include matching the requested space to a property owner (e.g., preventing a store from owning a geo-space covering a competitor's store). Verification can also match a description of the geo-space location (e.g., address) with the coordinates for the points in space. For instance, a request for registration might have a transposed number in the request. This might result in the geo-space being in a significantly different location that does not correspond to the description of the geo-space (e.g., the description is for a hotel and the location is over the ocean).

Space management service module 214 can correlate location data received from the geolocation service module 212 to a query received from configuration service module 216. Based upon the geo-fenced space indicated by the location data, the space management service module can identify a set of services, configurations, modifications and other aspects. This information can then be provided to the configuration service module. The configuration service module can then generate instructions for modifying the wireless access service according to the identified set. For example, the configuration service module may specify routing instructions, monitoring functions, encryption or combinations thereof. In some instances, the modifications to the wireless access service are related to one or more services or applications 208. The services and applications can provide a number of different functions. For instance, an individual that is browsing the web from within a geo-fenced space of a store can receive relevant advertisements from a service or application supported by the store (e.g., an application hosted on server that generates and provides advertisements). In another instance, an individual may be directed to an appropriate online form or online bulletin board depending upon the geo-fenced space. Other embodiments may direct reporting data to a service or application. For example, a government agency can track usage of public services (e.g., transportation, parks or others).

Figure 3:
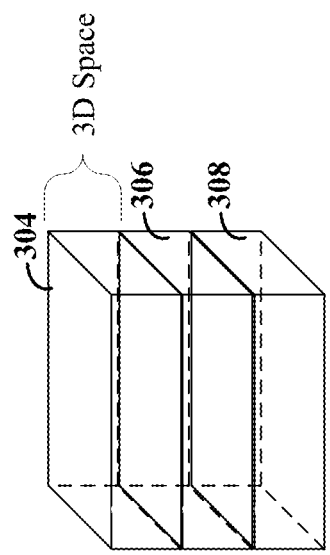
FIG. 3 depicts geo-fenced spaces that are two-dimensional (2D) and three-dimensional (3D), consistent with embodiments of the present disclosure.
Figure 3:
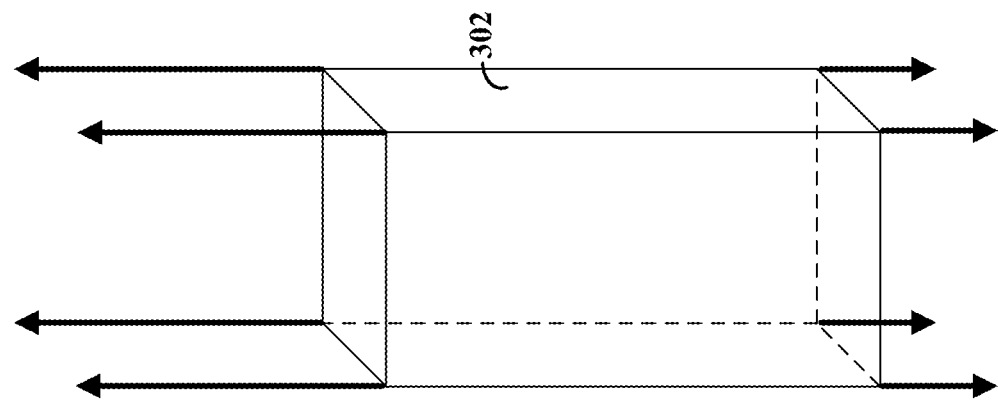

FIG. 3 depicts geo-fenced spaces that are two-dimensional (2D) and three-dimensional (3D), consistent with embodiments of the present disclosure. As discussed herein, a geo-fenced can be defined by a set of points in space. In some embodiments, this definition can be bounded by a 2D shape 302 and can extend indefinitely in a third direction (e.g., vertically relative to the surface of the Earth). This can be particularly useful for applications in which the third/vertical position is either not important or seldom relevant. For example, a 2D shape could correspond to the outer perimeter of a building and thereby capture all floors, including those underground. In another example, if the geo-fenced space is in an outdoor setting and designed for people walking on trails or similar ground-based activates, the elevation might not be necessary.

According to certain embodiments, the geo-fenced spaces can include 3D shapes 304, 306, 308. For instance, shapes 304, 306 and 308 can each be defined by a volume that corresponds to a different floor of a building or similar structure, and different services can be associated with each floor. As an example, each floor of a retail store may have different types of product offerings and associated services. In another example, different floors of an office building might have different companies, different departments, each of which may have different access rights to respective services.

Figure 4:
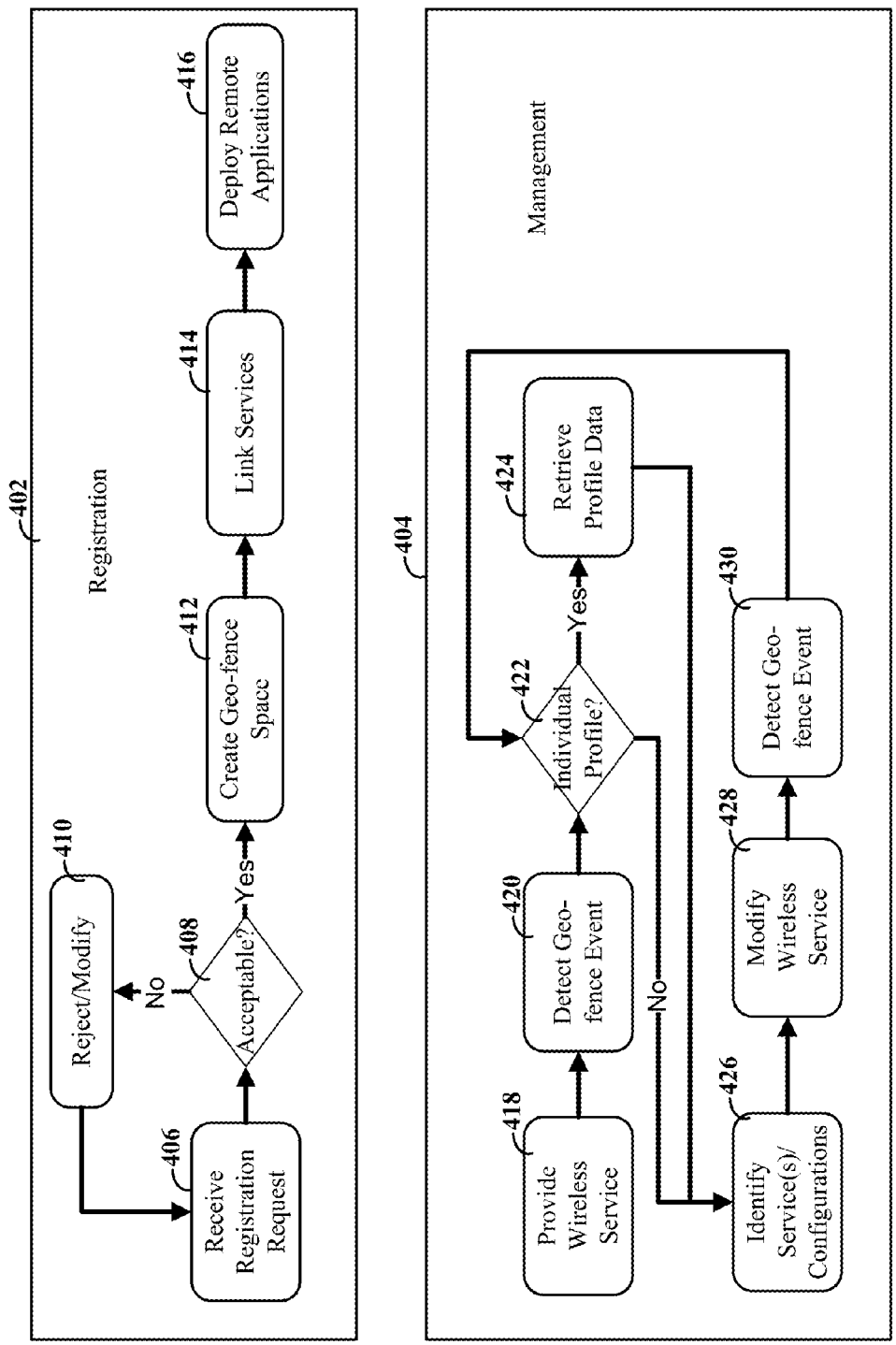
FIG. 4 is a diagram depicting a process flow for registering and managing geo-fenced spaces, consistent with embodiments of the present disclosure.

FIG. 4 is a diagram depicting a process flow for registering and managing geo-fenced spaces, consistent with embodiments of the present disclosure. Process flow 402 shows an example of how to register a geo-fenced space according to embodiments and may be consistent with the various systems, modules and components discussed herein. The wireless provider system can receive a request to register a geo-fenced space, as shown by block 406. As discussed herein, the wireless provider system can assess the validity of the request to determine whether or not the request is acceptable, as shown by block 408. For example, the wireless provider system can assess whether or not the requested geo-fenced space, as defined by respective sets of points in space, conflicts with existing geo-fenced spaces, matches the request description and/or meets other criteria. If the wireless provider system determines that the request is not acceptable the request can be rejected, as shown by block 410. In certain embodiments, the wireless provider system can provide options for the requestor to modify the request. For instance, the wireless provider system can provide an explanation for why the request was rejected and allow the requestor to modify the problematic portion of the request.

If the wireless provider system determines that the request is acceptable, the geo-fenced space can be created as an entity within the wireless provider system (e.g., within an SDN), as shown by block 412. The wireless provider system can then link the geo-fenced space to services, applications and configuration parameters, as shown by block 414. Remote applications can then be deployed, as shown by block 416.

Process flow 404 shows an example for how to manage existing geo-fenced spaces, consistent with embodiments of the present disclosure. The wireless provider system can provide wireless services to its customers, as shown by block 418. The wireless provider system can be designed to detect when geo-fenced events occur, as shown by block 420. A particular type of event can be when a device using the wireless services enters or leaves a geo-fenced space. For instance, when an electronic wireless device leaves a geo-fenced space, the wireless services can revert back to an unmodified state that corresponds to the wireless service as provided before the electronic wireless device entered a geo-fenced space. Events can also include the use of particular applications or a request for services associated with a geo-fenced space.

Consistent with certain embodiments, the wireless provider system can be configured to determine whether or not the mobile device that caused the event has an associated individual profile, as shown by block 422. For instance, some geo-fenced spaces may allow individuals to register with associated services. Profile data for the individual can be stored and used to customize how the wireless provider system responds to an event. If the wireless provider system determines that there is individual profile data, the profile data can be retrieved, as shown by block 424.

The wireless provider system can then identify which services, applications and configurations are associated with the geo-fenced area, as shown by block 426. As discussed herein, this identification can be based upon individual profile data, if available. Moreover, even if not available, the services, modifications and configurations can be attached or made on an individual/device by individual/device basis. Thus, different individuals/devices within the same geo-fenced space may have different services identified.

The wireless provider system can then modify the wireless service (e.g., by attaching identified services, changing routing options, adding monitoring or adding security features), as shown by block 428. The process can then repeat upon the detection of a new geo-fenced event, as shown by block 430.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
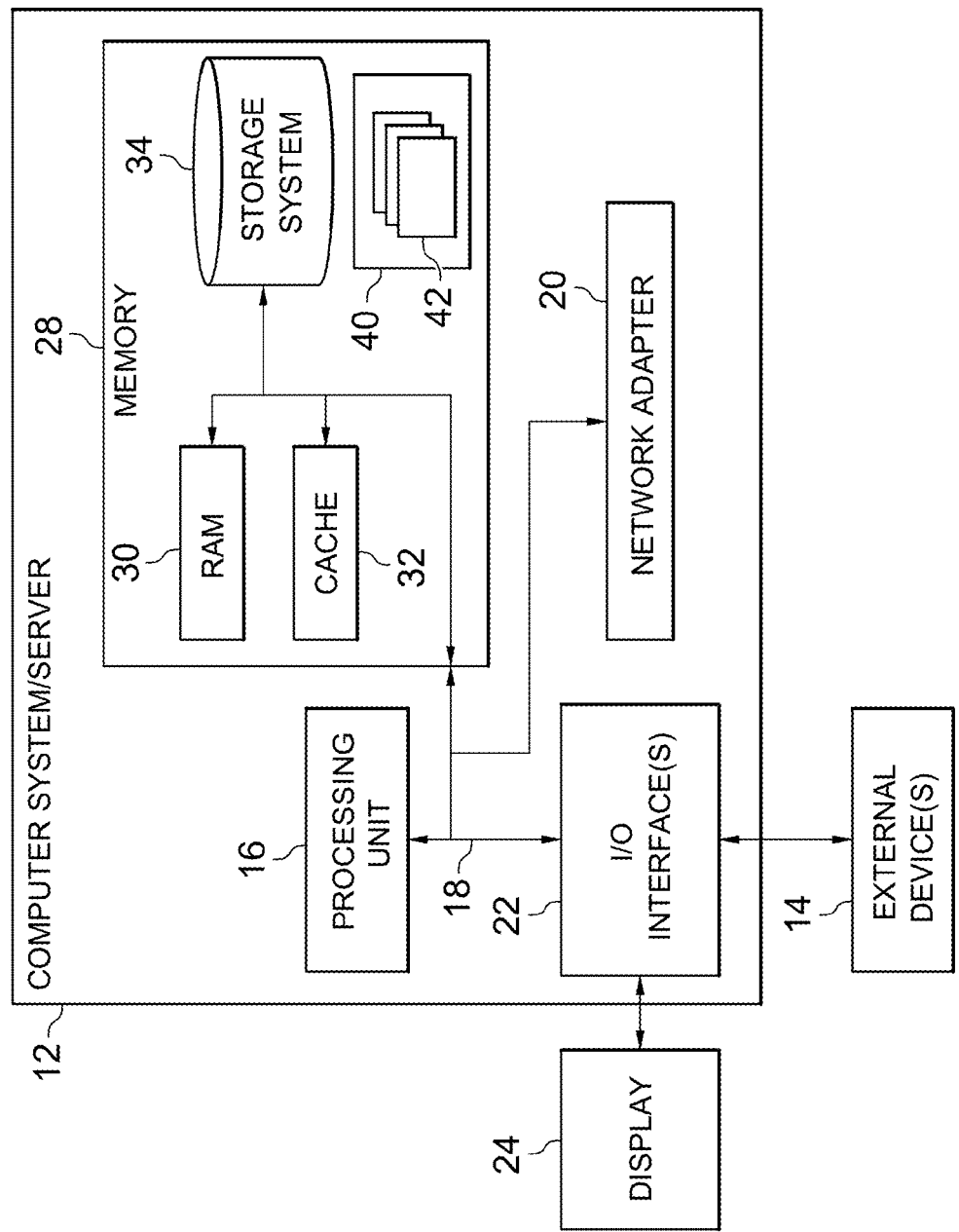
FIG. 5 depicts a cloud computing node, according to an embodiments of the present disclosure.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
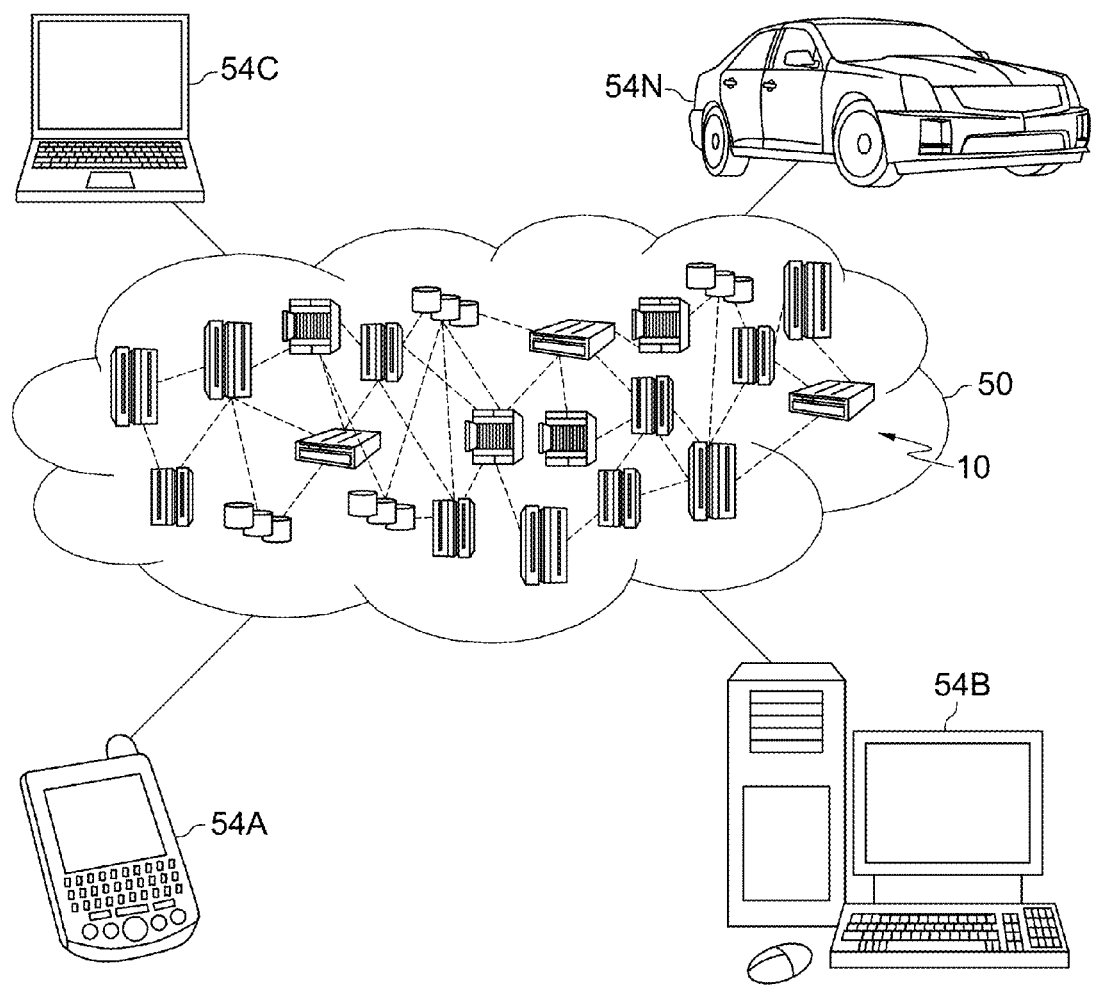
FIG. 6 depicts a cloud computing environment, according to embodiments of the present disclosure.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
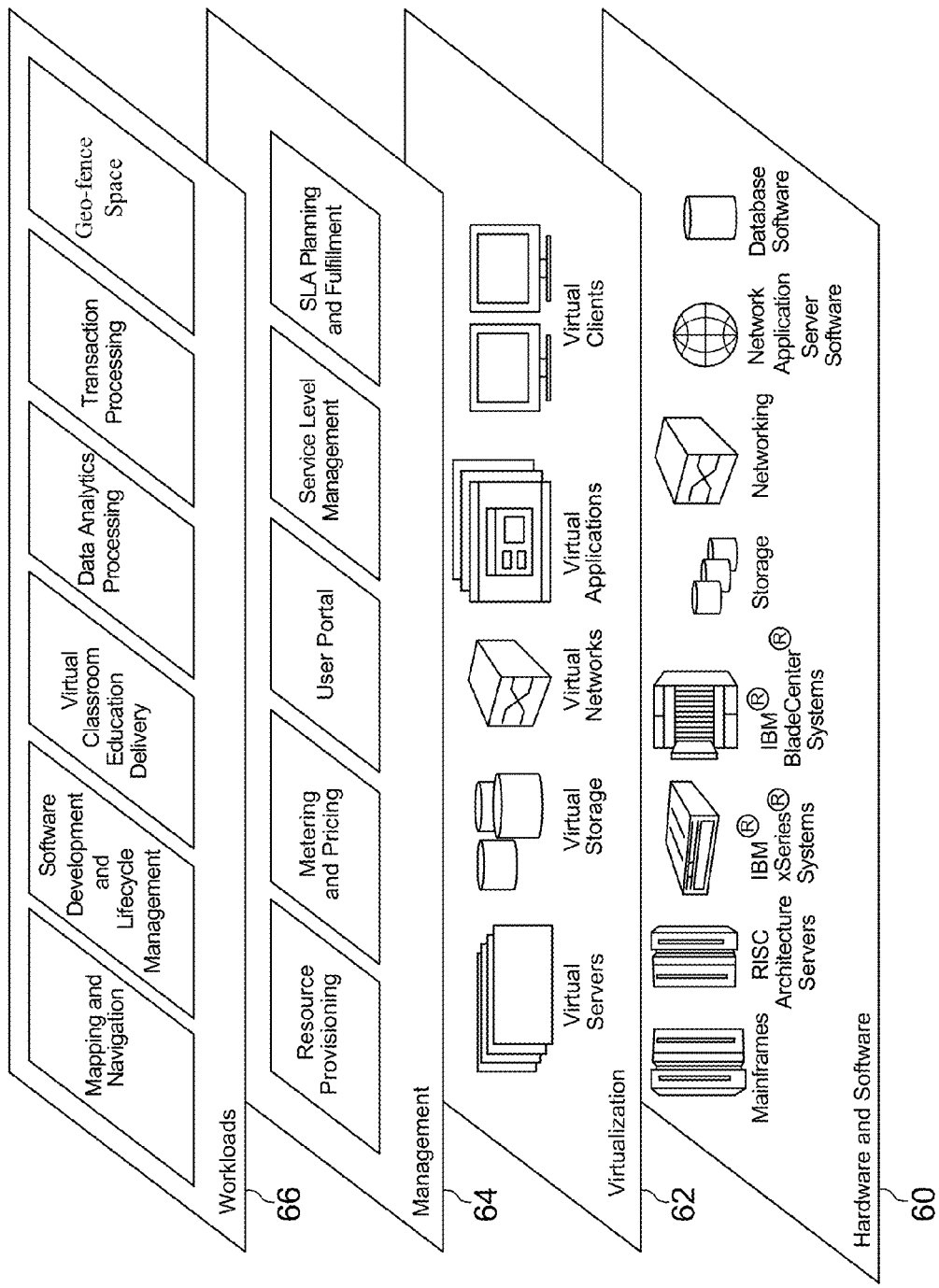
FIG. 7 depicts abstraction model layers, according to embodiments of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients. Various aspects of the present disclosure are directed toward deployment of components within the virtualization layer 62 using patterns that may include extensions, as discussed in more detail herein.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; and transaction processing; and geo-fenced space management.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for facilitating management of wireless access service provided to a plurality of electronic wireless devices based upon geo-fenced spaces defined by respective sets of points in space, the system comprising:
    a set of wireless access point devices configured to provide the wireless access service to the plurality of electronic wireless devices; and
    at least one computer circuit configured to
        detect that a particular electronic wireless device of the plurality of electronic wireless devices is within a particular geo-fenced space defined by a particular set of points in space among the geo-fenced spaces by determining the location of the particular electronic wireless device and is using the wireless access service by detecting when a mobile application on the particular electronic device requests information and services from a remote server,
        identify, in response to detecting that the particular electronic wireless device of the plurality of electronic wireless devices is within the particular geo-fenced space and is using the wireless access service, at least one service associated with the particular geo-fenced space,
        modify, in response to identifying the at least one service, the wireless access service provided to the particular electronic wireless device by attaching the at least one service to the particular electronic wireless device, wherein the at least one service has at least one function designed to use an infrastructure and capabilities of a wireless service provider system corresponding to the wireless access service,
        receive a plurality of requests, wherein each of the requests specifies
            a geo-fenced space defined by a set of points in space and
            one or more services to attach to electronic wireless devices within the geo-fenced space, verify, for the each of the requests, that the set of points in space defining the geo-fenced space provides valid boundaries by checking at least for conflicts with other existing spaces,
   wherein the checking comprises correlating the geo-fenced space with property boundaries owned by a registering space owner,
register, for the each of the requests, based upon data in the each of the requests, definitions for the geo-fenced space and links to corresponding services, in response to verifying that the set of points in space defining the geo-fenced space provides valid boundaries, and
   wherein the set of points in space define boundaries for the geo-fenced space.

2. The system of claim 1, wherein the at least one computer circuit is further configured to modify the wireless access service provided to the particular electronic wireless device by adding encryption to communications made using the wireless access service.

3. The system of claim 1, wherein the at least one computer circuit is further configured to modify the wireless access service provided to the particular electronic wireless device by changing an available bandwidth of the wireless access service.

4. The system of claim 1, wherein the at least one computer circuit is further configured to revert, in response to detecting that the particular electronic wireless device of the plurality of electronic wireless devices has left the particular geo-fenced space, the wireless access service to an unmodified state.

5. The system of claim 1, wherein the sets of points in space define a three-dimensional volume.

6. A computer program product for a wireless provider system to manage services provided to a plurality of electronic wireless devices based upon geo-fenced spaces defined by respective sets of points in space, the computer program product comprising a non-transitory computer readable storage medium having program instructions embodied therewith, the program instructions executable by one or more processing circuits of the wireless provider system to cause the one or more processing circuits to:

provide, by the wireless provider system, wireless access service to the plurality of electronic wireless devices;
detect, by the wireless provider system, that a particular electronic wireless device of the plurality of electronic wireless devices is within a particular geo-fenced space defined by a particular set of points in space among the geo-fenced spaces by determining the location of the particular electronic wireless device;
identify, by the wireless provider system and in response to detecting that the particular electronic wireless device of the plurality of electronic wireless devices is within the particular geo-fenced space, at least one service associated with the particular geo-fenced space;
modify, by the wireless provider system and in response to identifying the at least one service, the wireless access service provided to the particular electronic wireless device by attaching the at least one service to the particular electronic wireless device, wherein the at least one service has at least one function designed to use an infrastructure and capabilities of a wireless service provider system corresponding to the wireless access service;
receive a plurality of requests, wherein each of the requests specifies
   a geo-fenced space defined by a set of points in space and
   one or more services to attach to electronic wireless devices within the geo-fenced space;
verify, for the each of the requests, that the set of points in space defining the geo-fenced space provides valid boundaries by checking at least for conflicts with other existing spaces,
   wherein the checking comprises correlating the geo-fenced space with property boundaries owned by a registering space owner,
register, for the each of the requests, based upon data in the each of the requests, definitions for the geo-fenced space and links to corresponding services, in response to verifying that the set of points in space defining the geo-fenced space provides valid boundaries, and
wherein the set of points in space define boundaries for the geo-fenced space.

\* \* \* \* \*